US011846748B2

(12) United States Patent
Jiang et al.

(10) Patent No.: US 11,846,748 B2
(45) Date of Patent: Dec. 19, 2023

(54) DEEP LEARNING SEISMIC ATTRIBUTE FAULT PREDICTIONS (71) Applicant: Landmark Graphics Corporation, Houston, TX (US)

(72) Inventors: Fan Jiang, Sugar Land, TX (US); Phil Norlund, Spring, TX (US)

(73) Assignee: Landmark Graphics Corporation, Inc., Houston, TX (US)

( * ) Notice: Subject to any disclaimer, the term of this patent is extended or adjusted under 35 U.S.C. 154(b) by 531 days.

(21) Appl. No.: 16/745,044

(22) Filed: Jan. 16, 2020

(65) Prior Publication Data

US 2021/0181362 A1 Jun. 17, 2021

Related U.S. Application Data (60) Provisional application No. 62/948,553, filed on Dec. 16, 2019.

(51) Int. Cl.
*G01V 99/00* (2009.01)
*G01V 1/28* (2006.01)
(Continued)

(52) U.S. Cl.
CPC ............ *G01V 99/005* (2013.01); *G01V 1/008* (2013.01); *G01V 1/288* (2013.01); *G06F 17/18* (2013.01);
(Continued)

(58) Field of Classification Search
CPC ........ G01V 1/288; G01V 1/008; G06F 17/18; G06K 9/6267; G06N 3/08
See application file for complete search history.

(56) References Cited

U.S. PATENT DOCUMENTS 5,444,619 A 8/1995 Hoskins et al.
8,024,123 B2 * 9/2011 Priezzhev ................ G06N 3/02
175/58
(Continued)

FOREIGN PATENT DOCUMENTS

WO 2004063769 A2 7/2004

OTHER PUBLICATIONS

Lyu, et al.; "Seismic fault enhancement using spectral decomposition assisted attributes"; SEG International Exposition and 89th Annual Meeting; 10.1190/segam2019-3215703.1; 2019; 5 pgs.
(Continued)

*Primary Examiner* — Elias Desta
(74) *Attorney, Agent, or Firm* — Michael Jenney; Parker Justiss, P.C.

(57) ABSTRACT

This disclosure presents a fault prediction system using a deep learning neural network, such as a convolutional neural network. The fault prediction system utilizes as input seismic data, and then derives various seismic attributes from the seismic data. In various aspects, the seismic attributes can be normalized and have importance coefficients determined. A sub-set of seismic attributes can be selected to reduce computing resources and processing time. The deep learning neural network can utilize the seismic data and seismic attributes to determine parameterized results representing fault probabilities. The fault prediction system can utilize the fault probabilities to determine fault predictions which can be represented as a predicted new seismic data, such as using a three-dimensional image.

25 Claims, 9 Drawing Sheets

(51) Int. Cl.
  *G01V 1/00*   (2006.01)
  *G06F 17/18*  (2006.01)
  *G06N 3/08*   (2023.01)
  *G06F 18/24*  (2023.01)
  *G06V 10/764* (2022.01)
  *G06V 10/82*  (2022.01)

(52) U.S. Cl.
  CPC ............. *G06F 18/24* (2023.01); *G06N 3/08* (2013.01); *G06V 10/764* (2022.01); *G06V 10/82* (2022.01)

(56) References Cited

U.S. PATENT DOCUMENTS

| | | | |
|---|---|---|---|
| 8,684,108 B2* | 4/2014 | Turner | G05B 23/0243 |
| | | | 702/9 |
| 2010/0042327 A1* | 2/2010 | Garvey | E21B 47/00 |
| | | | 702/11 |
| 2015/0242747 A1 | 8/2015 | Packes et al. | |
| 2016/0313463 A1 | 10/2016 | Wahrmund et al. | |
| 2019/0162868 A1 | 5/2019 | Salman et al. | |

OTHER PUBLICATIONS

Philit, et al.; "Innovative Automatic Fault Detection using a Volume 3D Scanning Method"; SEG International Exposition and 89th Annual Meeting; 10.1190/segam2019-3214754.1; 2019; 5 pgs.

Zhang, et al.; "FaultNet: a deep CNN model for 3D automated fault picking"; SEG International Exposition and 89th Annual Meeting; 10.1190/segam2019-3215930.1; 2019; 5 pgs.

* cited by examiner

| 310 | | 315 |
|---|---|---|
| Attr_0 | = | SEISMIC AMPLITUDE |
| Attr_1 | = | RELATIVE AMPLITUDE CHANGE |
| Attr_2 | = | REFLECTION STRENGTH |
| Attr_3 | = | COSINE OF PHASE |
| Attr_4 | = | MOST POSITIVE CURVATURE |
| Attr_5 | = | THIN BED INDICATOR |
| Attr_6 | = | AZIMUTH |
| Attr_7 | = | RELATIVE AMPLITUDE CHANGE IN X |
| Attr_8 | = | APPARENT POLARITY |
| Attr_9 | = | SWEETNESS |
| Attr_10 | = | ENERGY HALF-TIME |
| Attr_11 | = | ROOT MEAN SQUARE FREQUENCY |
| Attr_12 | = | RELATIVE AMPLITUDE CHANGE IN Y |
| Attr_13 | = | ARC LENGTH |
| Attr_14 | = | MEAN CURVATURE |
| Attr_15 | = | RESPONSE PHASE |
| Attr_16 | = | DULL SURFACE |
| Attr_17 | = | ROOT MEAN SQUARE AMPLITUDE |
| Attr_18 | = | DIP |
| Attr_19 | = | RESPONSE FREQUENCY |
| Attr_20 | = | RELATIVE ACOUSTIC IMPEDANCE |
| Attr_21 | = | RESPONSE AMPLITUDE |
| Attr_22 | = | INSTANTANEOUS FREQUENCY |
| Attr_23 | = | SEMI-SHINY SURFACE |
| Attr_24 | = | SHINY SURFACE |
| Attr_25 | = | DISCONTINUITY ALONG DIP |
| Attr_26 | = | AVERAGE FREQUENCY |
| Attr_27 | = | DISCONTINUITY |
| Attr_28 | = | INSTANTANEOUS PHASE |
| Attr_29 | = | MOST NEGATIVE CURVATURE |
| Attr_30 | = | SYNTHETIC FAULT LABEL |

ATTRIBUTE 4

ATTRIBUTE 7

ATTRIBUTE 12

ATTRIBUTE 29

ATTRIBUTE 25

ATTRIBUTE 1

DEEP LEARNING SEISMIC ATTRIBUTE FAULT PREDICTIONS

CROSS-REFERENCE TO RELATED APPLICATION

This application claims the benefit of U.S. Provisional Application Ser. No. 62/948,553, filed by Fan Jiang, et al. on Dec. 16, 2019, entitled "DEEP LEARNING SEISMIC ATTRIBUTE FAULT PREDICTIONS," commonly assigned with this application and incorporated herein by reference in its entirety.

TECHNICAL FIELD

This application is directed, in general, to processing seismic data and, more specifically, to predicting subterranean faults.

BACKGROUND

When developing a well operation plan, a drilling plan, or other well system operation, one input that can be used for those plans is seismic data representing faults and subterranean formation characteristics. Drilling plans, for example, can be altered to avoid subterranean hazards or to enhance natural fractures for improved hydrocarbon flow. Current techniques for processing the seismic data may lead to a fault representation that does not have the desired level of accuracy, such as false positives on fault detection or missing faults. Some conventional techniques use deep learning neural networks while not refining the seismic data potentially leading to less accurate models. Other techniques do not use deep learning models which may lead to the analysis process being more burdensome. A technique that can increase the fault prediction accuracy while not exceeding computational resource thresholds would be beneficial.

SUMMARY

In one aspect, a method to predict subterranean formation faults is disclosed. In one embodiment, the method includes (1) receiving seismic data correlating to a subterranean formation, (2) deriving a set of seismic attributes from the seismic data, (3) determining parameterized results by analyzing the seismic data and the set of seismic attributes using a deep learning neural network (DNN), wherein the DNN has been trained using previous seismic data and previous seismic attributes, and (4) calculating one or more fault probabilities utilizing the parameterized results.

In a second aspect, a method to train a fault predictor DNN is disclosed. In one embodiment, the method includes (1) receiving one or more sets of seismic data correlating to one or more respective subterranean formations, wherein the subterranean formations are part of one or more well systems, (2) deriving a set of seismic attributes for each of the one or more sets of seismic data, (3) normalizing seismic attributes in the set of seismic attributes, (4) generating multi-channel data, wherein the multi-channel data is derived from the one or more sets of seismic data and respective sets of seismic attributes, and (5) training the DNN by analyzing the multi-channel data and applying fault labels.

In a third aspect, a system to predict faults is disclosed. In one embodiment the system includes (1) seismic data receiver, capable of receiving seismic data from one or more sources, wherein the seismic data correlates to a subterranean formation, (2) a seismic attribute deriver, capable to derive a set of seismic attributes from each of the received seismic data, and (3) a fault predictor DNN, capable of analyzing the received seismic data and each of the sets of seismic attributes utilizing a trained DNN model, and providing parameterized results representing fault probabilities.

In a fourth aspect, a computer program product having a series of operating instructions stored on a non-transitory computer-readable medium that directs a data processing apparatus when executed thereby to perform operations to predict subterranean formation faults is disclosed. In one embodiment the computer program product has operations including (1) receiving seismic data correlating to a subterranean formation, (2) deriving a set of seismic attributes from the seismic data, (3) determining parameterized results by analyzing the seismic data and the set of seismic attributes using a DNN, wherein the DNN has been previously trained using previous seismic data and previous seismic attributes, and (4) computing one or more fault probabilities utilizing the parameterized results.

BRIEF DESCRIPTION OF THE DRAWINGS

Reference is now made to the following descriptions taken in conjunction with the accompanying drawings, in which.

DETAILED DESCRIPTION

When developing and planning a well system, it is beneficial to understand the nature, composition, and fault structure of the subterranean formations through which operations will be conducted, such as drilling operations, hydraulic fracturing, and other well system operations. One set of factors used in the analyzation of the well system can be the faults and fault patterns of the subterranean formations. Understanding where the faults are located, positioned, and orientated can aide in determining an operation plan and allow for the identification of potential subterranean hazards.

Conventional fault prediction techniques may result in fault predictions that have less accuracy than specified for the well system. Different levels of signal to noise ratio and frequency bands can degrade the prediction accuracy. Fault planes may not be correctly identified thereby leading to a less optimal operation plan. Some conventional fault prediction techniques may be time-consuming where the time to analyze the collected data can introduce time delays in implementing the operation plan, thereby increasing operational costs. In addition, conventional techniques may not incorporate sufficient data to meet an accuracy threshold. In some conventional deep learning neural network techniques, image segmentation and feature extraction may be relied on rather than the use of seismic attribute derivations. Improving the accuracy of the fault predictions can lower costs through optimizing operations as well as avoiding subterranean hazards that could increase time and costs, such as causing additional maintenance on drilling assemblies.

This disclosure presents a fault prediction technique using a neural network, such as a deep learning neural network (DNN), that uses seismic data collected from tools and seismic attributes derived from the seismic data. The technique can result in faster fault predictions, such that they can be run in near real-time at a well system job site, and uses seismic attributes to increase the fault prediction accuracy. The seismic attributes can provide more granular detail on the seismic data to improve the analyzation results from the DNN.

Seismic attributes, which are data parameters extracted or derived from seismic data, are used to analyze and enhance the quality of geological or geophysical interpretations. The set of seismic attributes can be derived from the seismic amplitude data by analyzing the data in a moving one-dimensional, two dimensional, or three-dimensional window. The data analyzation can, for example, utilize one or more of a frequency parameter, a density parameter, an amplitude parameter, a thermal parameter, a radioactivity parameter, an absorption parameter, and other subterranean formation parameters. A DNN can be trained utilizing the seismic data and the seismic attributes, for example, using multi-channels for a deep learning convolutional neural network (CNN). The seismic attributes can be considered as a channel to feed to the input layer of the DNN, During training, seismic attributes can serve as a guide to provide finer structure information where the original seismic data can present such information as noise. Seismic attributes can be assigned an importance coefficient to assist in weighting the value of the respective seismic attribute. In addition, each importance coefficient can be correlated with a standard deviation to provide additional information for the DNN training. The seismic attributes can identify discontinuous structures and also represent the continuity of amplitude events in order to provide additional structural information.

The utilization of the seismic attributes can improve the identification of fault planes and reduce false-positive predictions compared to previous conventional techniques. Seismic attributes can be pre-calculated from the seismic data or calculated during the training process of the DNN. A sub-set of seismic attributes can be selected and used when training or executing the fault prediction process. The selection of seismic attributes for the sub-set can represent edge detection data, as well as distinguish sub-surface continuity and dip information. For example, a sub-set of seismic attributes can include discontinuity, relative amplitude change in x-axis and y-axis orientations, sweet, curvature, and other types of seismic attributes.

Figure 1:
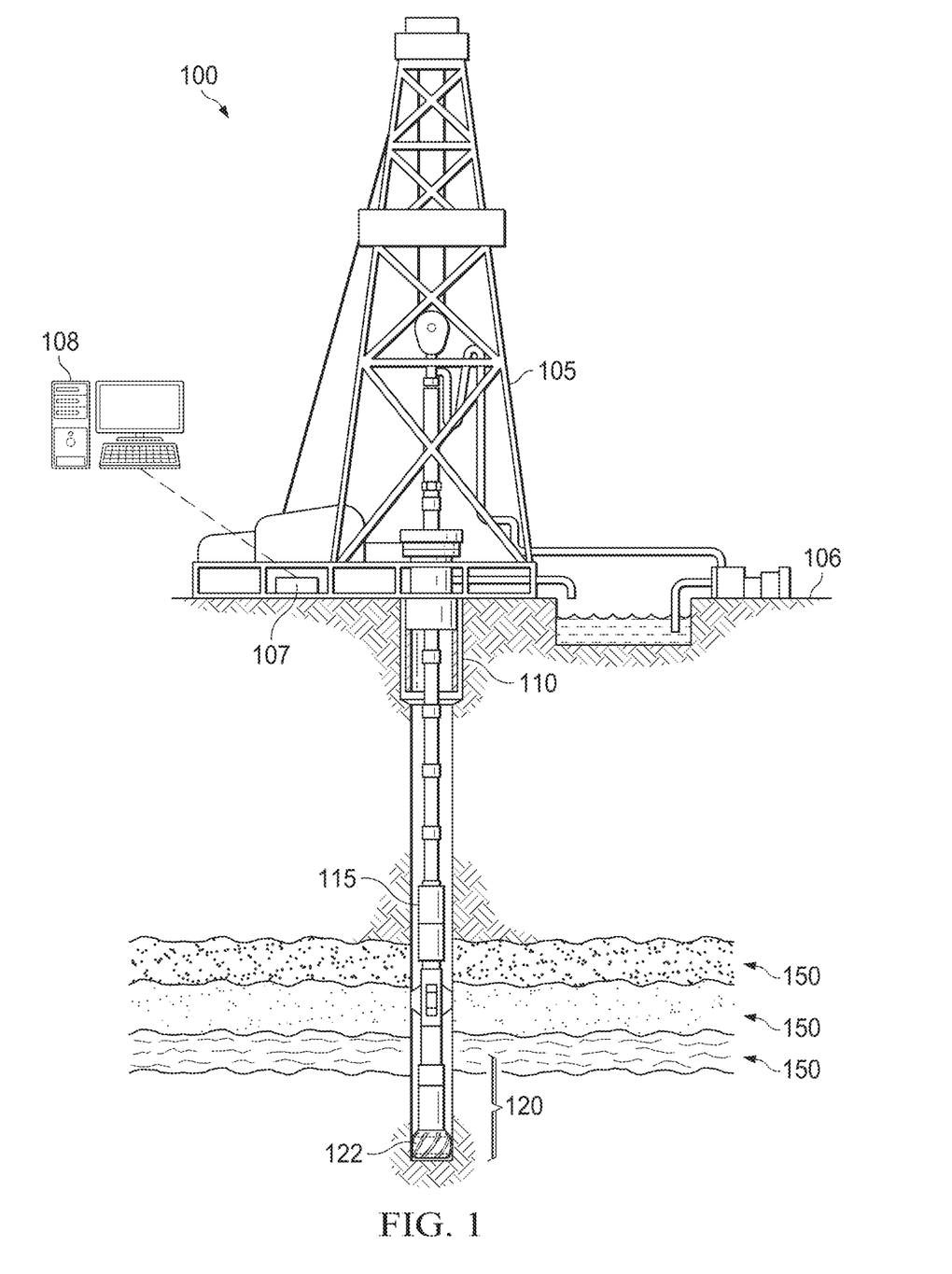
FIG. 1 is an illustration of a diagram of an example well system developed using seismic data fault predictions.

Turning now to the figures, FIG. 1 is an illustration of a diagram of an example well system 100, for example, a drilling system, an extraction system, a production system, a wireline system with a pump, and other hydrocarbon well systems, developed using seismic data fault predictions. Well system 100 includes a derrick 105, a well site controller 107, and a computing system 108. Well site controller 107 includes a processor and a memory and is configured to direct operation of well system 100. Derrick 105 is located at a surface 106.

Extending below derrick 105 is a borehole 110 with a drill string 115 inserted within borehole 110. Located at the bottom of drill string 115 are downhole tools 120. Downhole tools 120 can include various downhole tools and bottom hole assemblies (BHA), such as a drilling bit 122 and seismic telemetry devices. Other components of downhole tools 120 can be present, such as a local power supply (e.g., a generator), batteries, capacitors, telemetry systems, as well as a transceiver and a control system. Borehole 110 is surrounded by subterranean formation 150.

Well site controller 107, or a computing system 108 communicatively coupled to well site controller 107, can be utilized to communicate with downhole tools 120, such as sending and receiving seismic data correlated to subterranean formation 150, telemetry, data, instructions, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, and other computing systems that are capable to perform the process and methods described herein. Well site operators, engineers, and other personnel can also send and receive the seismic data, telemetry, data, instructions, and other information by various conventional means with computing system 108 or well site controller 107.

The seismic data collected by downhole tools 120 can be used as the seismic data inputs into the fault prediction system. Seismic data can be received from other sources as well, such as other sensors located within borehole 110 or at surface 106, a database, cloud storage, server, and other data storage devices. The fault prediction system can be executed on computing system 108, well site controller 107, or another computing system proximate well system 100 or a distance from well system 100. The resulting fault predictions can be utilized to modify the well operation plan and drilling plan for well system 100.

Figure 2:
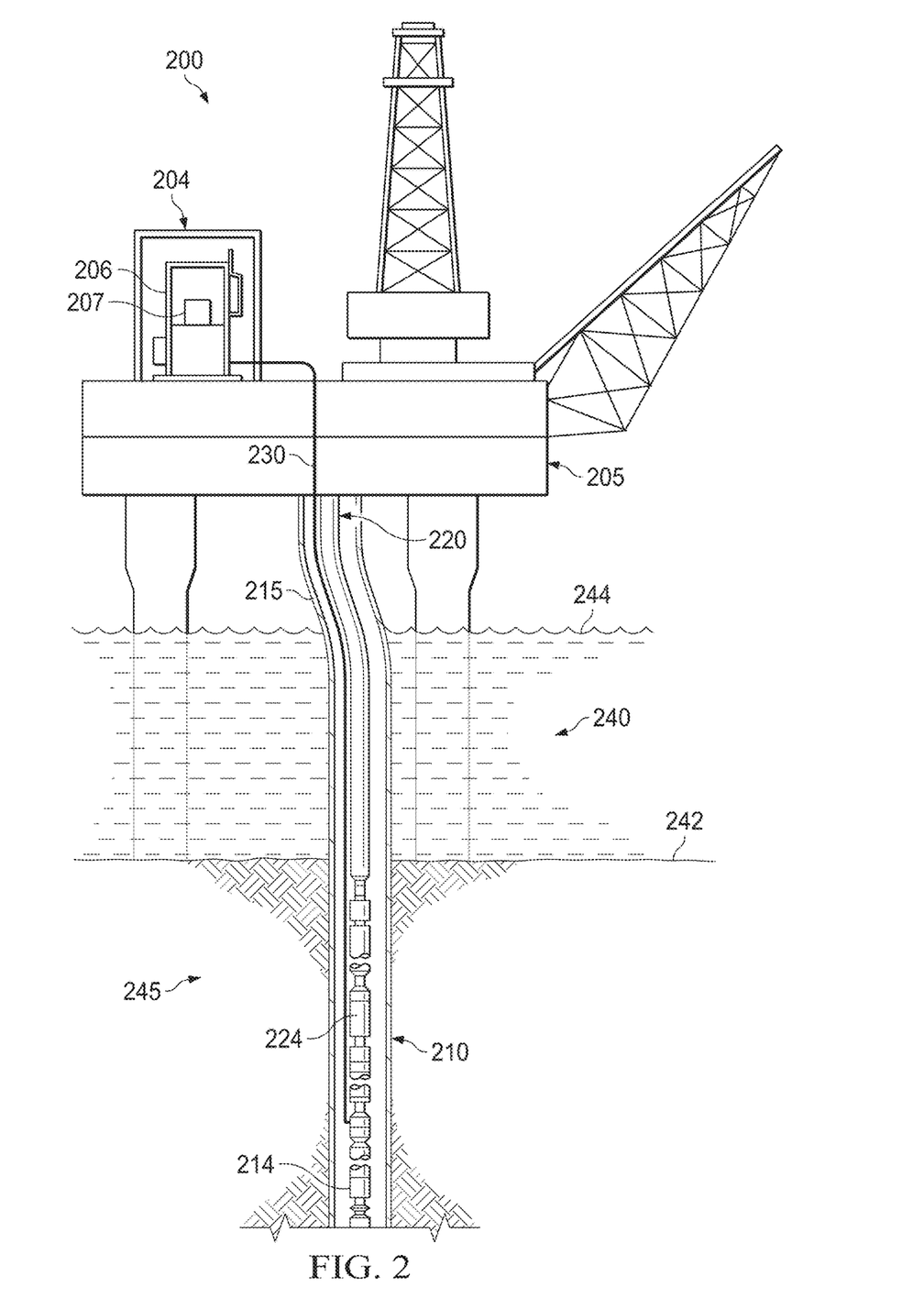
FIG. 2 is an illustration of a diagram of an example offshore well system using seismic data fault predictions.

While FIG. 1 depicts an onshore operation, those skilled in the art will understand that the disclosure is equally well suited for use in offshore operations, such as illustrated in FIG. 2. Additionally, FIGS. 1 and 2 depict specific borehole configurations. Those skilled in the art will also understand that the disclosure is equally well suited for use in boreholes having other orientations including vertical boreholes, horizontal boreholes, slanted boreholes, multilateral boreholes, and other borehole types.

FIG. 2 is an illustration of a diagram of an example offshore well system 200 using seismic data fault predictions, where a downhole tool is placed downhole in a borehole 210 below a body of water 240, such as an ocean or sea. Water 240 has a surface 244 and has a bottom at a subterranean surface 242. The downhole tool can be various tools, pumps, assemblies, devices, sensors, and other downhole tools. For demonstration, an electric submersible pump (ESP) assembly 220 is shown as the downhole tool. Borehole 210 is surrounded by subterranean formation 245. ESP assembly 220 can also be used for onshore operations. ESP assembly 220 includes a well controller 207 (for example, to act as a speed and communications controller of ESP assembly 220), a motor 214, and a pump 224.

Well controller 207 can be placed in a cabinet 206 inside a control room 204 on an offshore platform 205, such as an oil rig. Well controller 207 is configured to adjust the operations of motor 214 to improve well productivity. In the illustrated embodiment, motor 214 is a two-pole, three-phase squirrel cage induction motor that operates to turn pump 224. Motor 214 is located near the bottom of ESP assembly 220, just above downhole sensors within borehole 210. A power cable 230 extends from well controller 207 to motor 214.

In some embodiments, pump 224 can be a horizontal surface pump, a progressive cavity pump or an electric submersible progressive cavity pump. A drill riser 215 can separate ESP assembly 220 from water 240 and subterranean formation 245. Perforations in drill riser 215 can allow the fluid of interest from subterranean formation 245 to enter borehole 210.

Fault predictions can be utilized to guide future operations of offshore well system 200, such as faults within subterranean formation 245. In some aspects, ESP assembly 220 can include seismic tools to collect seismic data, which can then be communicated to well controller 207. Well controller 207, or another communicatively coupled computing system, can implement the fault prediction system as described herein to generate new seismic data that can be used as input into the well operation plan.

Figure 3A:
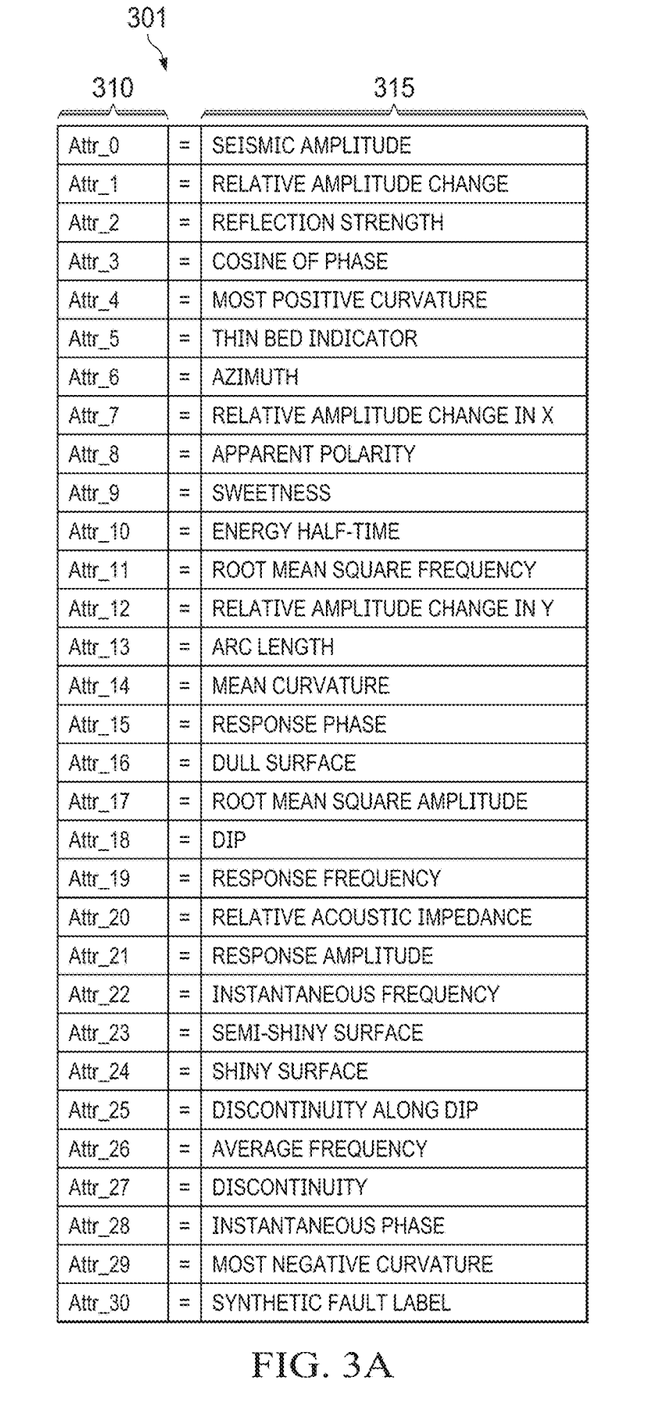
FIG. 3A is an illustration of a listing of an example seismic attribute list.

FIG. 3A is an illustration of a listing of an example seismic attribute list 301. Seismic attribute list 301 is a partial listing of available seismic attributes. Additional seismic attributes can be added to the process such that they can be trained within the deep learning model for potential use in future analysis processing. Seismic attribute list 301 has an identification 310 for each seismic attribute that is tracked within the deep learning model, with a seismic attribute description 315 associated with each identification 310.

Figure 3B:
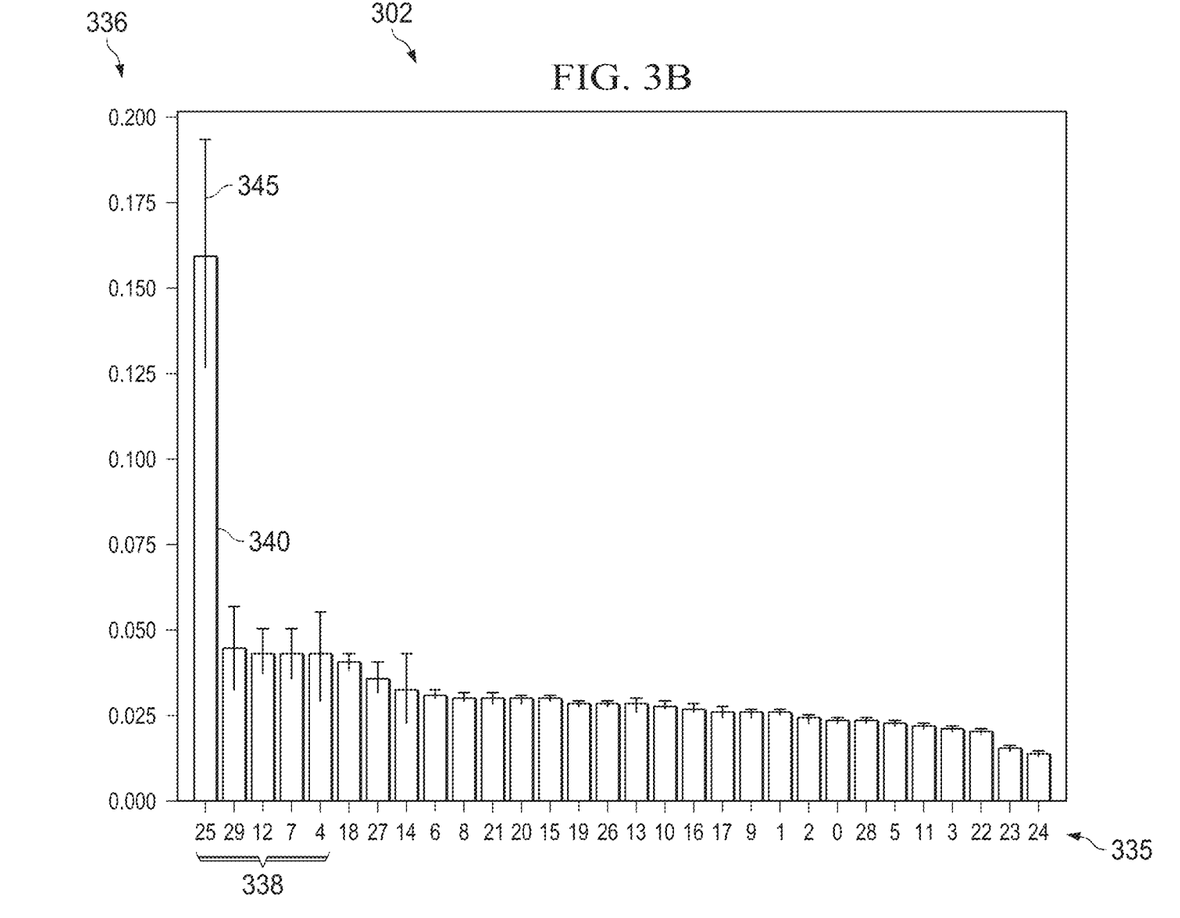
FIG. 3B is an illustration of a chart of an example importance coefficient graph using the seismic attribute list of FIG. 3A.

FIG. 3B is an illustration of a chart of an example importance coefficient graph 302 using the seismic attribute list of FIG. 3A. Importance coefficient graph 302 can be generated using various decision tree algorithms to compute the importance of selected seismic attributes as well as a standard deviation parameter. For example, the decision tree algorithms can be a random forest classifier, a decision tree classifier, a gradient boosting classifier, or an extra trees classifier. Importance coefficient graph 302 includes an x-axis 335 that list identification 310 for each seismic attribute. Y-axis 336 is the importance coefficient for the identified seismic attributes. For this example, the seismic attributes have been ordered by their respective importance coefficients, in descending order. Implemented fault prediction systems can organize data in various ways that is convenient for the specific input layer of the DNN being utilized.

Plot area of importance coefficient graph 302 shows the selected seismic attributes weighted by the importance coefficient. For example, seismic attribute 25 is shown as bar 340. Seismic attribute 25 is also demonstrating an example standard deviation 345 shown as a black line. Importance coefficient graph 302 is for visual demonstration; graphing the data is not necessary for implementing the processes described herein.

In this example, the first five seismic attributes have been selected as a sub-set of seismic attributes 338. Sub-set of seismic attributes 338 can be the seismic attributes used within the training process and fault prediction process. The respective processes can use its own sub-set of seismic attributes. For example, the training process can use a larger sub-set of seismic attributes (such as eight, ten, or another amount) to improve the training of the trained model, e.g., trained DNN model, while the fault prediction process, e.g., fault predictor DNN, can use a smaller sub-set of seismic attributes (such as four, five, or another amount) to reduce computational resources and time. A computational time limit parameter or a user input can be used to determine the number of seismic attributes to use in the sub-set. The selection of the seismic attributes for the sub-set can utilize various criteria, with the criteria of the highest weighted importance coefficients shown as selected in this example. The processes can use various numbers of seismic attributes, where the increase in computing cost of additional seismic attributes being a primary factor in determining the number to use. In some aspects, some or all of the seismic attributes can be utilized.

Figure 3C:
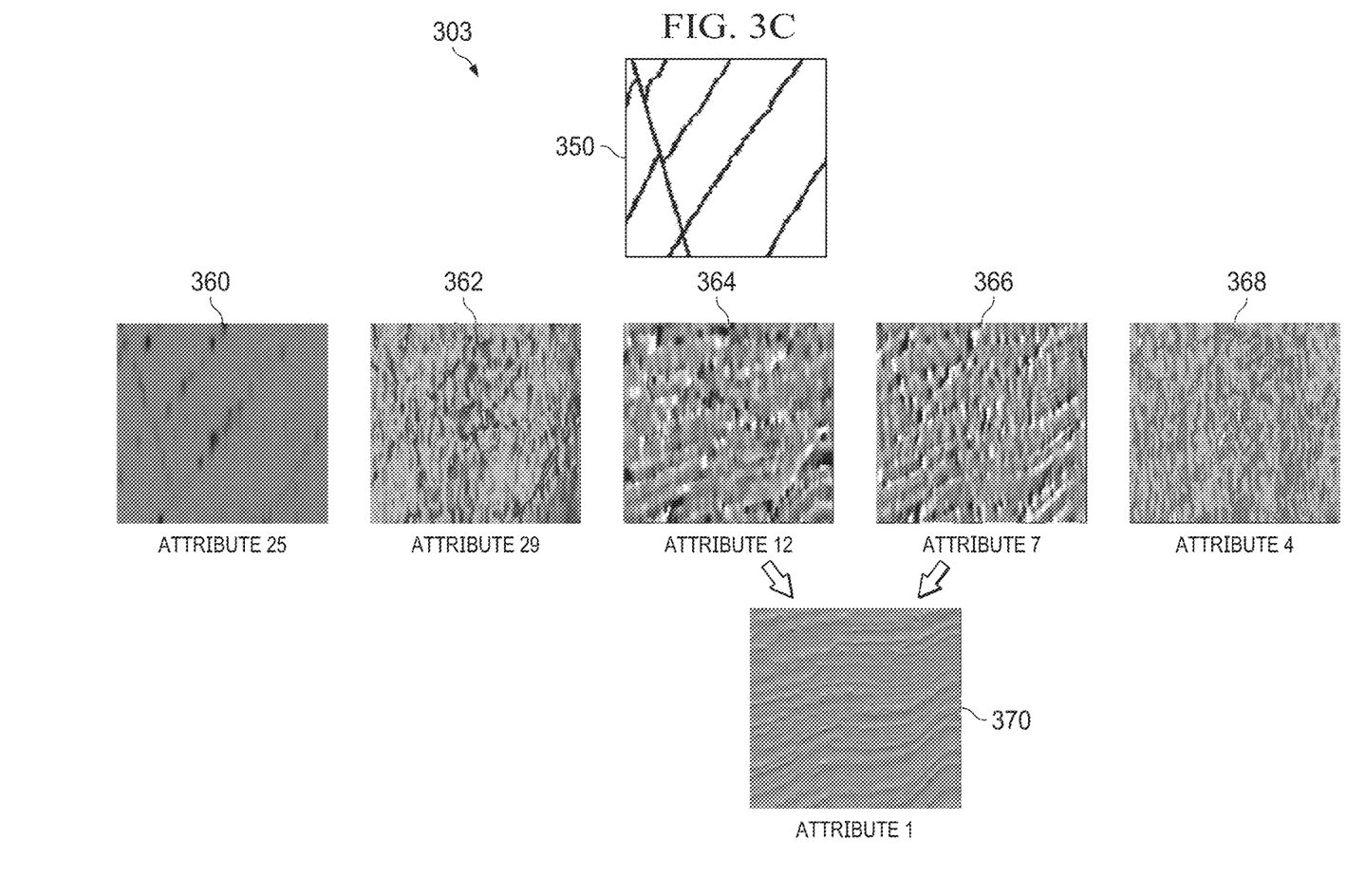
FIG. 3C is an illustration of representative data of an example seismic attribute replacement, building on FIG. 3B.

FIG. 3C is an illustration of representative data of an example seismic attribute replacement 303, building on FIG. 3B. Seismic attribute replacement 303 has a representative image block 350 showing an example subterranean formation fault that is represented by the selected seismic attributes.

Image block 360 corresponds to seismic attribute 25 representing the discontinuity dip. Image block 362 corresponds to seismic attribute 29 representing the negative curvature. Image block 364 corresponds to seismic attribute 12 representing the relative amplitude change in the y-axis direction. Image block 366 corresponds to seismic attribute 7 representing the relative amplitude change in the x-axis direction. Image block 368 corresponds to seismic attribute 4 representing the positive curvature. The seismic attributes 25, 29, 12, 7, and 4 correspond to the list of attributes in FIG. 3A.

Through analysis, seismic attribute 12 and seismic attribute 7 can be determined to be characteristically similar, e.g., having a similar seismic attribute characteristic. For example, characteristically similar can be that the seismic attributes represent a similar attribute (1) in an orientation, such as inline/crossline or X-Y-Z axes, (2) in a formation characteristic, such as dip, discontinuity, curvature, or surface, (3) in a mathematical representation, such as amplitude, frequency, or root mean squares, or (4) in other similar seismic attribute characteristics. The process would benefit from replacing these seismic attributes with a single substantially characteristically similar seismic attribute as opposed to maintaining separate importance coefficient weightings. Image block 370 corresponds to seismic attribute 1 of FIG. 3A representing the relative amplitude change that is not sub-divided by an axis orientation. Seismic attribute 12 and seismic attribute 7 can be replaced by a single seismic attribute 1 thereby improving the weighting imposed by the importance coefficients. When the balance of importance coefficients have been improved, the accuracy of the resulting fault predictions can also be improved.

Figure 4A:
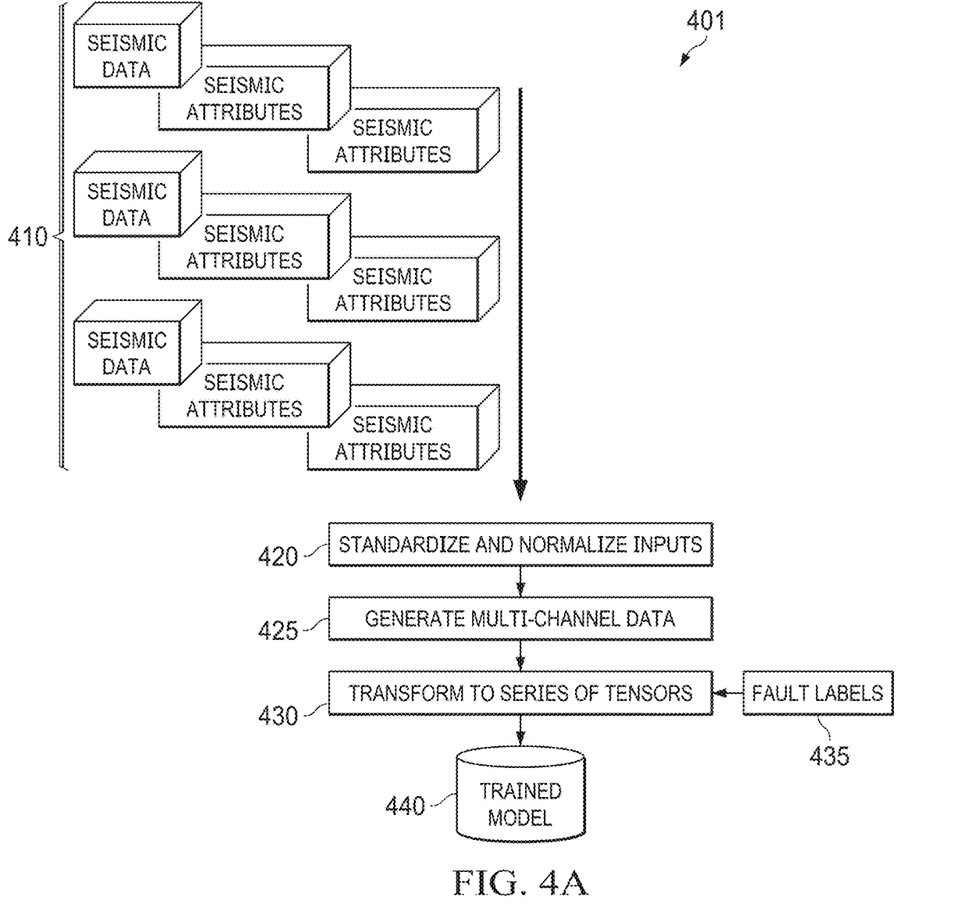
FIG. 4A is an illustration of a flow diagram of an example training method for a fault prediction system.
Figure 8:
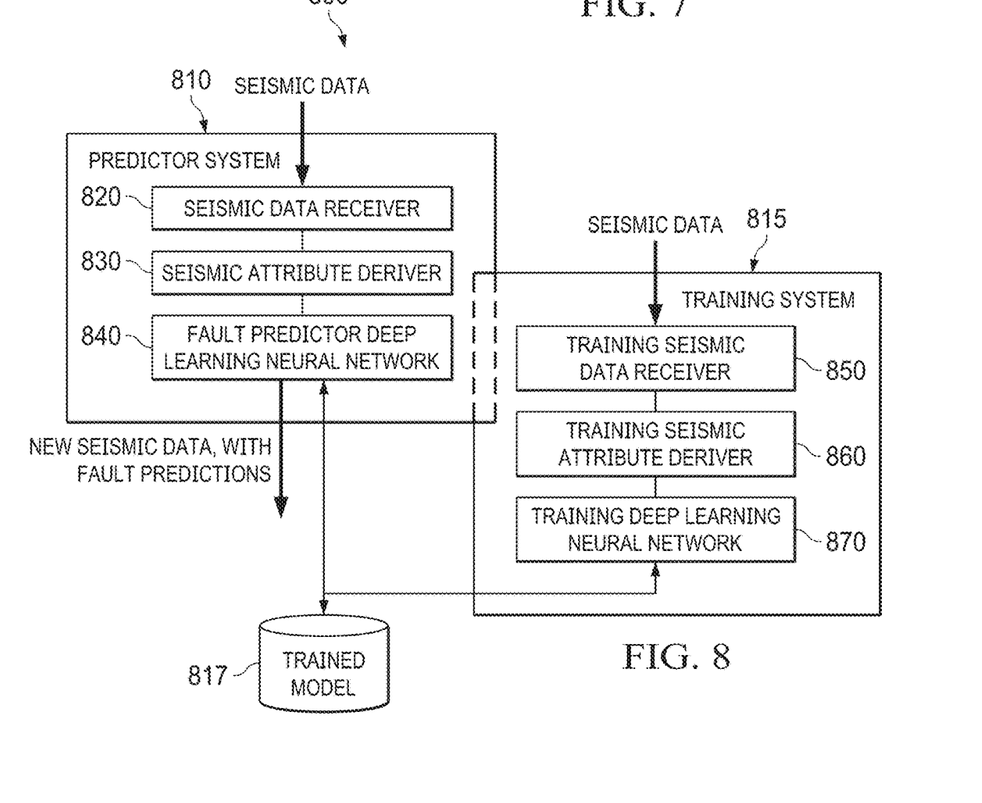
FIG. 8 is an illustration of a block diagram of an example fault predictor system.

FIG. 4A is an illustration of a flow diagram of an example training method 401 for a fault prediction system. Training method 401 can be used to train a neural network, such as a DNN, to perform fault probability analysis. Training method 401 can be performed, for example, on a fault predictor system 800 as illustrated in FIG. 8. Training method 401 starts at a step 410 where seismic data can be collected. The training process can use one or more seismic data sets. The seismic data can be received from various sources, such as a well system, a data storage system, server, cloud storage, data center, and other sources. A separate set of seismic attributes can be derived for each of the sets of seismic data.

The seismic data and corresponding seismic attributes are then standardized and normalized in a step 420. The normalization algorithm can utilize various baselines, with an inclusive decimal range of zero to one or negative one to positive one most commonly utilized. The normalized data inputs can then be standardized for the input layer used for the training DNN. In a step 425, the input data can be transformed into a four-dimensional tensor, e.g., 4D cube, or other type of multi-channel data depending on the type of DNN utilized.

In a step 430, the input data can be transformed into a series of three-dimensional tensors that can be processed by the training DNN. In addition, in a step 435, fault labels can be selected and applied to the transformed data within the training DNN. In a step 440, the trained model can be stored and enabled for use for fault probability analysis by a fault predictor DNN.

Figure 4B:
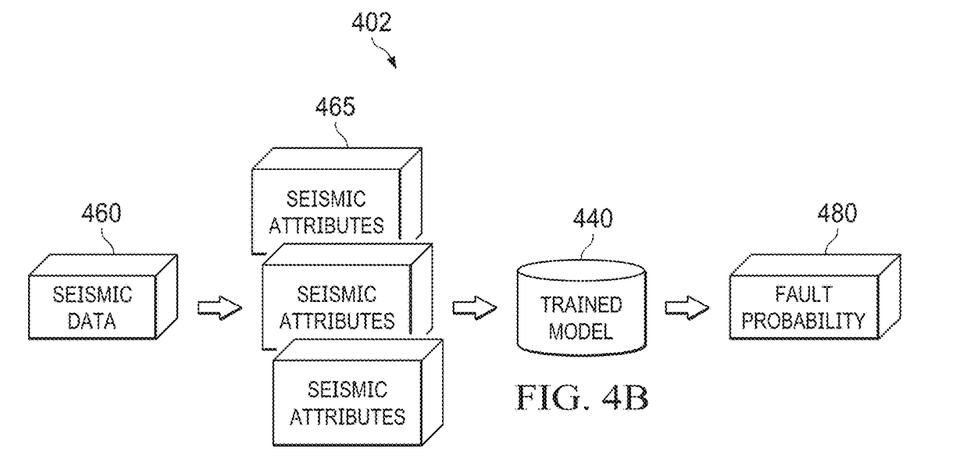
FIG. 4B is an illustration of a flow diagram of an example fault predictor method.

FIG. 4B is an illustration of a flow diagram of an example fault predictor method 402. Fault predictor method 402 can be used to analyze seismic data to generate fault probabilities and a subsequent fault prediction utilizing the fault probabilities. Fault predictor method 402 can be performed, for example, on fault predictor system 800.

Fault predictor method 402 starts at a step 460 where seismic data is received. In a step 465, a set of seismic attributes can be derived from the seismic data. In some aspects, the seismic attributes can be normalized, such as to an inclusive decimal range of 0.0 to 1.0 or −1.0 to 1.0. In some aspects, an importance coefficient can be determined for the seismic attributes. The importance coefficient can be determined using various algorithms, such as random forest. In addition, a standard deviation parameter can be determined for each importance coefficient. In some aspects, a sub-set of seismic attributes can be selected, such as selecting the four or five seismic attributes with the numerically highest importance coefficients. The importance coefficients can be utilized, along with the standard deviations, by the fault predictor DNN as corresponding input parameters and weighting factors to the respective seismic attribute input. In some aspects, an analysis can be performed where two or more seismic attributes can be replaced by a different seismic attribute. The replacement can occur when the analysis determines that accuracy can be improved when the replaced seismic attributes are characteristically similar and therefore can adversely affect the importance coefficient weighting. The replacement seismic attribute is substantially characteristically similar to the seismic attributes being replaced.

In a step 440, the seismic data and the set of seismic attributes, or a sub-set of seismic attributes, is processed by the trained model. Using conventional DNN processing, the trained model can determine parameterized results. The parameterized results can be used to calculate a set of fault probabilities of the subterranean formation. In a step 480, the fault probabilities can be transformed into predicted new seismic data representing the fault predictions of the system. The new seismic data can then be utilized by a user or other computing systems as input for other processes and decisions, such as being used to modify an operational plan of a well system.

Figure 5:
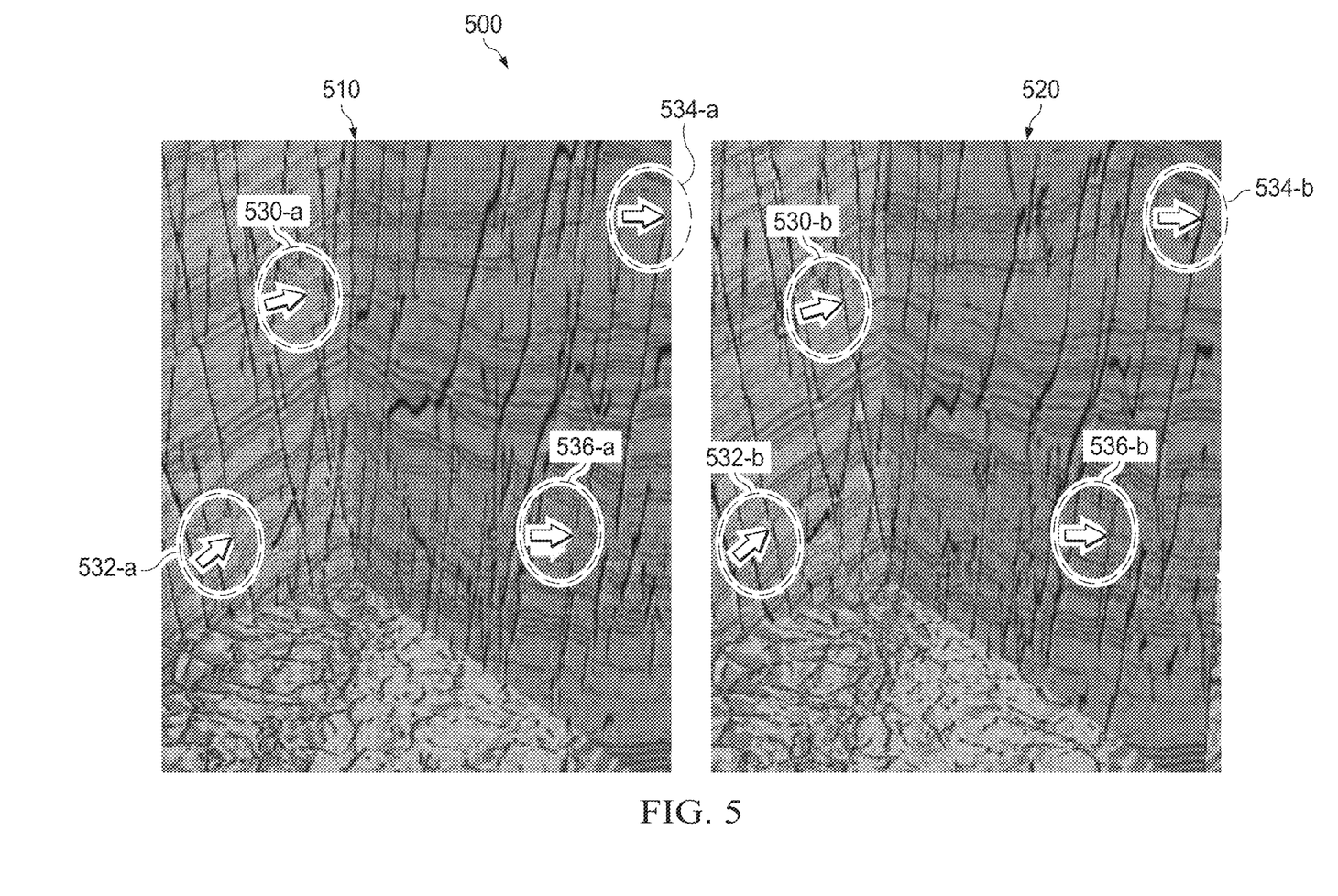
FIG. 5 is an illustration of diagrams of example outputs showing new seismic data.

FIG. 5 is an illustration of diagrams of example outputs showing new seismic data 500. New seismic data 500 demonstrates a comparison of an output from a conventional fault model prediction system and an output from the fault model prediction system as described herein. New seismic data 500 demonstrates that the herein described fault prediction system can produce more accurate fault models.

Image 510 is a predicted new seismic data output by a conventional fault model prediction system. Image 520 is a predicted new seismic data output by the fault prediction system as described herein. Image 510 is the same subterranean formation as Image 520. Circle 530-a, circle 532-a, circle 534-a, and circle 536-a highlight regions of the seismic data, represented as an image, where a fault line is not present within the circle highlight. Circle 530-b, circle 532-b, circle 534-b, and circle 536-b highlight respectively same regions of the seismic data—correlating to respective '-a' circles, where a fault line is present within the circle highlight. Image 520 represents more accurate fault predictions for the same subterranean formation.

Figures 6A, 6B:
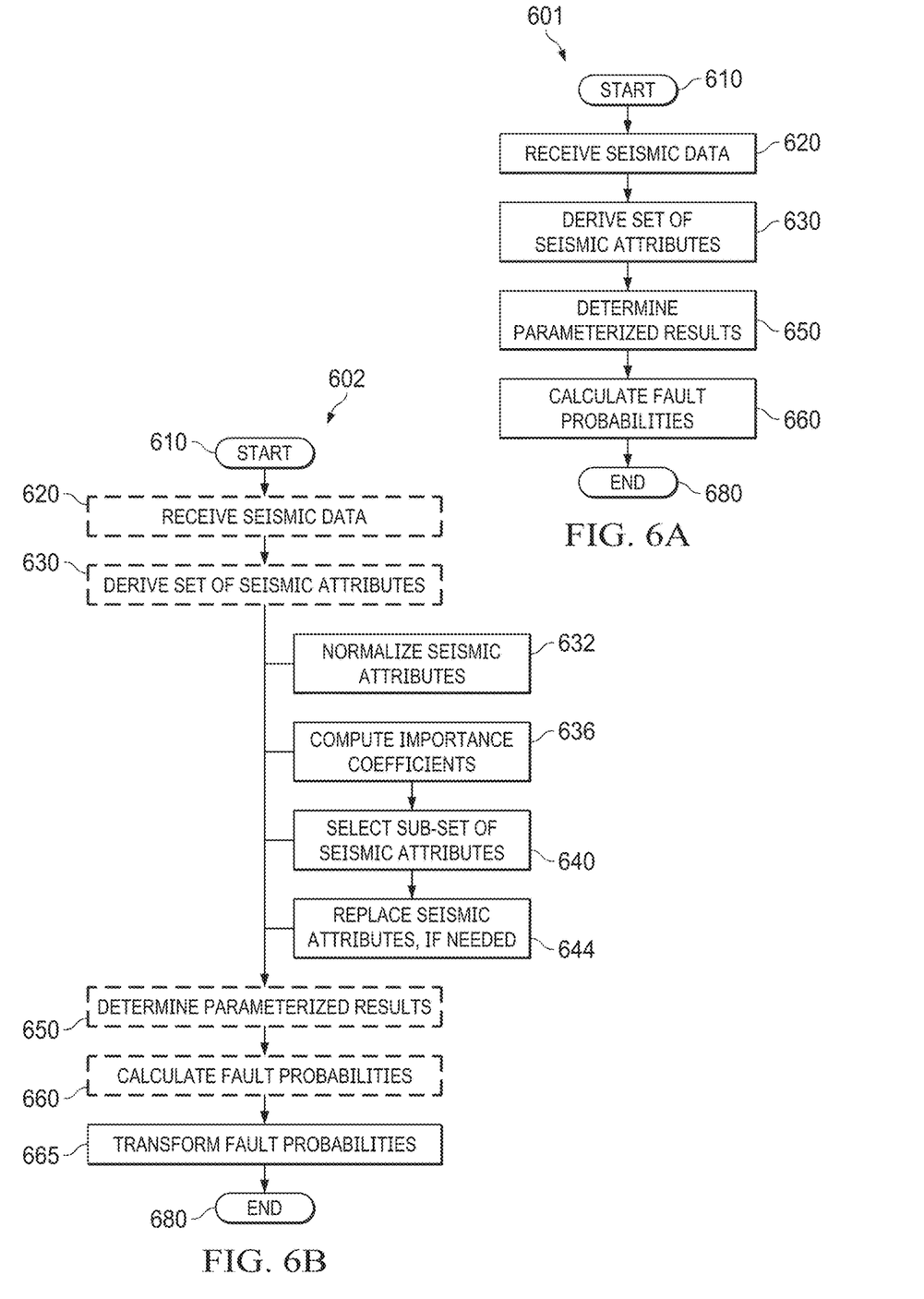
FIG. 6A is an illustration of a flow diagram of an example method for predicting subterranean faults.
FIG. 6B is an illustration of a flow diagram of an example method, building on FIG. 6A, with a seismic attribute replacement.

FIG. 6A is an illustration of a flow diagram of an example method 601 for predicting subterranean faults. Method 601 can be implemented using a computing system, such as fault predictor system 800. Method 601 starts at a step 610 and proceeds to a step 620. In step 620 the seismic data can be received, such as from a computing source, a data storage, or other system capable of collecting, storing, and communicating seismic data. In some aspects, seismic data can be received from a seismic sensor located at a well system.

In a step 630 a set of seismic attributes can be derived from the seismic data. The number of seismic attributes in the set can vary, such as by the type of seismic data received. The number of seismic attributes can also be limited to limit the impact on the computing resources available to perform the processes of predicting subterranean faults and to reduce the computational time. The number of seismic attributes can be determined by user input, by default value, or through an analysis of a computational time limit parameter with the available computing resources. In a step 650 the seismic data and seismic attributes are analyzed to determine parameterized results. The seismic data and seismic attributes can be input into a trained DNN that receives the seismic data and seismic attributes and performs the analysis. Depending on the input layer structure of the DNN, the seismic data and seismic attributes can be transformed into varying tensors to satisfy the DNN.

In a step 660, one or more fault probabilities can be calculated using the parameterized results from the trained model. The fault probabilities can be output for further analysis. The method 601 ends at a step 680.

FIG. 6B is an illustration of a flow diagram of an example method 602, building on FIG. 6A, with a seismic attribute replacement. Method 602 can be implemented using a computing system, such as fault predictor system 800. The steps of method 601 are shown using dashed outlined boxes and can be performed as described with respect to method 601 unless otherwise denoted below. The new steps of method 602 are shown in solid outlined boxes. Method 602 starts at step 610 and proceeds through to step 630. Step 630 can be expanded with a step 632 and a step 636. Step 632 and step 636 can be performed in various orders, and in some aspects, step 632 or step 636 can be bypassed.

Step 632 can normalize one or more of the seismic attributes. The normalization can utilize various baseline ranges, for example, 0.0 to 1.0, −1.0 to 1.0, and other baseline ranges. The normalization process can improve the weighting accuracy given to the seismic attributes. From step 632, method 602 can proceed to step 636 or to step 650.

Step 636 can compute the importance coefficient for the seismic attributes. The importance coefficient can be determined using various decision tree algorithms, such as random forest. The importance coefficient can be utilized to rank the relative weights of the seismic attributes. In some aspects, a standard deviation parameter can be computed for each seismic attribute. The importance coefficient and standard deviation are part of the seismic attribute data that can be used as inputs to a fault predictor DNN, such as fault predictor DNN 840 in FIG. 8. From step 636, method 602 can proceed to step 650 or proceed to a step 640.

In step 640, a sub-set of the seismic attributes can be selected. The sub-set of seismic attributes can reduce the computer resources and computational time by reducing the amount of data to be processed. The number of seismic attributes selected can be from one to the total number of available seismic attributes, where a typical range is three to six seismic attributes. Additional seismic attributes can be utilized, usually with an increase in computational cost and time. Typically, the sub-set of seismic attributes can be populated by selecting the seismic attributes with the largest importance coefficient, e.g., weighting, though other selection criteria can be utilized. Method 602 can proceed to step 650 or to a step 644 from step 640.

In step 644, a replacement of seismic attributes can be performed. In the sub-set of seismic attributes, there can be two or more attributes that represent a characteristically similar attribute and have an approximately equal, or near equal, importance coefficient. The multiple similar seismic attributes can unfairly influence the importance coefficient weighting within the DNN processing. To improve the DNN accuracy, the multiple seismic attributes can be replaced by a single seismic attribute that presents a substantially characteristically similar attribute. This can provide a more accurate weighting when processed through the DNN. For example, a seismic attribute that can be determined in an inline orientation and a crossline orientation can be replaced by a single similar seismic attribute that incorporates the inline and crossline orientations. From step 644, method 602 proceeds to step 650 and step 660.

From step 660 method 602 proceeds to a step 665. In step 665, the fault probabilities are transformed into a fault prediction, which can be represented by a predicted new seismic data, such as a three-dimensional image of the subterranean formation. The predicted new seismic data can be output for further use and analysis, such as by a well system operation plan. Method 602 ends at step 680.

Figure 7:
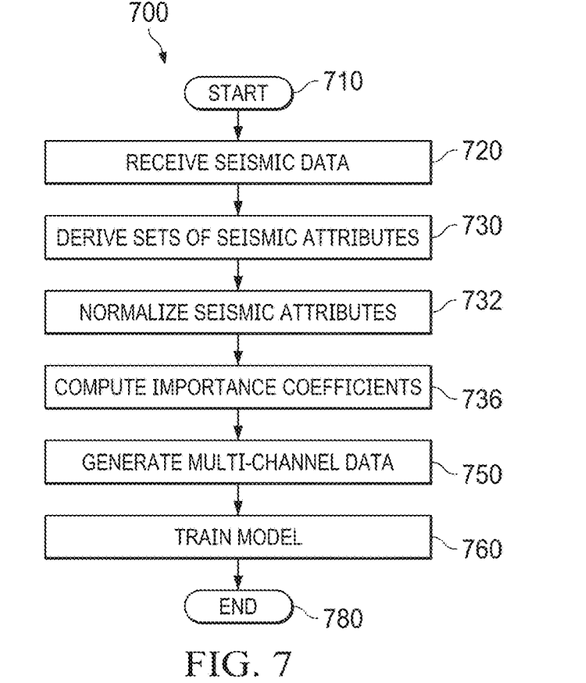
FIG. 7 is an illustration of a flow diagram of an example method for training a fault predictor system.

FIG. 7 is an illustration of a flow diagram of an example method 700 for training a fault predictor system. Method 700 can be implemented using a computing system, such as fault predictor system 800. Method 700 starts at a step 710 and proceeds to a step 720. In step 720, one or more sets of seismic data can be received. The seismic data can be received from a well system, such as a well system controller, a data center, cloud storage, server, and other data storage locations. The received seismic data can be for the same or varying subterranean formations.

In a step 730, a set of seismic attributes, for each set of seismic data, can be derived. In a step 732, the seismic attributes can be normalized using a determined baseline range. In a step 736, an importance coefficient and a standard deviation parameter can be computed for the selected seismic attributes. In some aspects, the set of seismic attributes used for the sets of seismic data can be reduced, such as selecting a sub-set of seismic attributes that have the largest importance coefficients. Random forest, decision tree, gradient boosting, and extra trees are types of classifiers that can be used to determine and rank the importance coefficients. Other selection techniques can be utilized as well, such as selecting seismic attributes that are pertinent for the type of mineral or rock which makes up the subterranean formation or an analysis by a user. The sub-set of seismic attributes does not need to match the sub-set of seismic attributes utilized in a subsequent execution of the fault prediction system, such as method 602. By reducing the number of seismic attributes used as input for training, the performance of the training process can be improved while reducing the computing resources.

In a step 750, the sets of seismic data and corresponding sets of seismic attributes (or the corresponding sub-sets of seismic attributes, if determined), are transformed into a tensor form aligning with the input layer of the training DNN, and used as the data input for the model. In a step 760, the fault prediction model is trained by applying synthetic fault labels to the input data. The trained model can then be stored and enabled for later use as a trained DNN. In some aspects, the training DNN can be the same as the fault predictor DNN. Method 700 ends at a step 780.

FIG. 8 is an illustration of a block diagram of an example fault predictor system 800. Fault predictor system 800 can be used to train a DNN and to perform analysis of seismic data to generate a predicted new seismic data that incorporates fault predictions. Fault predictor system 800 includes a predictor system 810, a training system 815, and a trained DNN model 817.

Predictor system 810 and training system 815 can be the same or separate systems, and each can be a software application, a hardware system or circuitry, or various combinations thereof. For example, predictor system 810 can be performed on a central processing unit (CPU), graphics processing unit (GPU), or other processing unit. Training system 815 can be performed on the same or different processing unit as predictor system 810. Similarly, predictor system 810 and training system 815 can be part of the same software application, can share some software features and functions, or be separate software applications.

Predictor system 810 includes a seismic data receiver 820, a seismic attribute deriver 830, and a fault predictor DNN 840. Seismic data receiver 820 is capable of receiving seismic data from one or more sources, for example, a well site controller, a data center, cloud environment, server, tablet, smartphone, and other devices capable of providing seismic data. The seismic data correlates to a subterranean formation. The seismic data can be communicated to seismic attribute deriver 830. Seismic attribute deriver 830 can derive one or more seismic attributes from the seismic data, normalize the seismic attributes, determine importance coefficients and standard deviation parameters for the seismic attributes, select a sub-set of seismic attributes using a specified selection parameter, and replace two or more seismic attributes with a single seismic attribute, where the seismic attributes are substantially characteristically similar.

Fault predictor DNN 840 can receive the seismic data and the adjusted seismic attributes (or a sub-set thereof), and using trained DNN model 817, can generate parameterized results representing fault probabilities. Predictor system 810 can additionally transform the fault probabilities into fault predictions that can be represented as predicted new seismic data, such as an image or a set of data. The predicted new seismic data can be output to another application, system, device, computing system, communication channel, intranet, internet, and other output destinations for further use, such as to be analyzed or used as inputs into an operation plan.

Training system 815 includes a training seismic data receiver 850, a training seismic attribute deriver 860, and a training DNN 870. Training seismic data receiver 850 is capable of receiving one or more sets of seismic data from one or more sources, for example, a well site controller, a data center, cloud environment, server, tablet, smartphone, and other devices capable of providing seismic data. The set of seismic data can represent the same or different subterranean formations. The seismic data can be communicated to training seismic attribute deriver 860. Training seismic attribute deriver 860 can derive one or more seismic attributes from each of the sets of seismic data, normalize the seismic attributes, determine importance coefficients and standard deviation parameters for each seismic attribute, select a sub-set of seismic attributes using a specified selection parameter for each set of seismic data, and replace two or more seismic attributes with a single seismic attribute.

Training DNN 870 can receive the sets of seismic data and the correlated adjusted seismic attributes, and using trained DNN model 817, can assign fault labels to the input data elements, thereby training trained DNN model 817. In some aspects, the assignment of fault labels is performed by training DNN 870. In other aspects, the assignment of fault labels is performed by a user.

Seismic data receiver 820, seismic attribute deriver 830, fault predictor DNN 840, training seismic data receiver 850, training seismic attribute deriver 860, and training DNN 870 can be implemented as one or more software applications, functions, software libraries, dynamic link libraries, modules, dedicated circuitry, or various combinations thereof. These components can share executable code as well. In some aspects, seismic data receiver 820 and training seismic data receiver 850 can be the same seismic data receiver. In some aspects, seismic attribute deriver 830 and training seismic attribute deriver 860 can be the same seismic attribute deriver. In some aspects, fault predictor DNN 840 and training DNN 870 can be the same DNN. In some aspects, predictor system 810 and training system 815 can be the same system. Trained DNN model 817 can be various data storage formats and devices, for example, files or databases stored on a server, data center, cloud storage, other data storage mediums, and combinations thereof.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Various aspects of the disclosure can be claimed including those noted in the summary. Each of the aspects noted in the summary may have one or more of the elements of the dependent claims presented below in combination.

What is claimed is:

1. A method to predict subterranean formation faults, comprising:
    collecting seismic data using seismic sensors, wherein the seismic data corresponds to a subterranean formation;
    deriving a set of seismic attributes from the seismic data;
    determining parameterized results by analyzing the seismic data using a deep learning neural network (DNN) and the set of seismic attributes that increases the granularity of the seismic data for the analyzing, wherein the DNN has been trained using previous seismic data and previous seismic attributes;
    calculating one or more fault probabilities of the subterranean formation utilizing the parameterized results and the seismic data;
    identifying, using one or more computing systems, potential subterranean hazards in the subterranean formation using the one or more fault probabilities; and
    directing a well system operation for the subterranean formation, wherein the directing is via the one or more computing systems using the potential subterranean hazards.

2. The method as recited in claim 1, further comprising:
    normalizing each seismic attribute in the set of seismic attributes prior to determining the parameterized results.

3. The method as recited in claim 1, further comprising:
    transforming the one or more fault probabilities as a predicted new seismic data and utilizing the predicted new seismic data to modify an operational plan of a well system.

4. The method as recited in claim 1, further comprising:
computing an importance coefficient for each seismic attribute in the set of seismic attributes, wherein the importance coefficient is utilized by the DNN.

5. The method as recited in claim 4, further comprising: computing a standard deviation parameter for each respective importance coefficient, wherein the standard deviation parameter is utilized by the DNN.

6. The method as recited in claim 1, further comprising: selecting a sub-set of seismic attributes from the set of seismic attributes, wherein determining the parameterized results utilizes the sub-set of seismic attributes as the set of seismic attributes.

7. The method as recited in claim 6, further comprising: replacing two or more characteristically similar seismic attributes in the sub-set of seismic attributes with a substantially characteristically similar non-selected seismic attribute.

8. The method as recited in claim 7, wherein a user review is utilized for replacing the two or more characteristically similar seismic attributes.

9. The method as recited in claim 6, wherein a number of seismic attributes in the sub-set of seismic attributes is determined by a user input or a computational time limit parameter.

10. The method as recited in claim 6, wherein the sub-set of seismic attributes is selected using one of a random forest classifier, a decision tree classifier, a gradient boosting classifier, or an extra trees classifier.

11. The method as recited in claim 1, wherein the deriving the set of seismic attributes utilizes one or more of a frequency parameter, a density parameter, an amplitude parameter, a thermal parameter, a radioactivity parameter, and an absorption parameter.

12. A computer implemented method to train a fault predictor deep neural network (DNN) for predicting subterranean formation faults from seismic data and seismic attributes, comprising:
receiving one or more sets of seismic data correlating to one or more respective subterranean formations, wherein the subterranean formations are part of one or more well systems;
deriving a set of seismic attributes for each of the one or more sets of seismic data;
generating multi-channel data, wherein the multi-channel data is derived from the one or more sets of seismic data and respective sets of seismic attributes;
applying the multi-channel data to an input layer of the DNN;
training the DNN for predicting subterranean formation faults in the subterranean formations by applying the multi-channel data to an input layer of the DNN, analyzing the multi-channel data and applying fault labels;
identifying potential subterranean hazards in the subterranean formation using the trained DNN; and
performing a well operation for the well system using a computing system and the potential subterranean hazards.

13. The method as recited in claim 12, further comprising: computing an importance coefficient for seismic attributes in each set of seismic attributes, wherein the importance coefficient is utilized for training the DNN.

14. The method as recited in claim 12, further comprising: storing the trained DNN; and
enabling the trained DNN for use.

15. The method as recited in claim 12, wherein the fault labels are assigned utilizing user input.

16. A well system, comprising:
a computing subsystem including:
a seismic data receiver, capable of receiving seismic data from one or more sources, wherein the seismic data correlates to a subterranean formation;
a processor to perform operations including:
deriving a set of seismic attributes from each of the received seismic data,
analyzing the received seismic data utilizing a trained DNN model and the sets of seismic attributes,
providing parameterized results representing fault probabilities for the subterranean formation based on the analyzing, wherein the sets of seismic attributes increases the granularity of the received seismic data during the analyzing,
identifying potential hazards in the subterranean formation using the parameterized results, and
directing an operation for the well system using the potential hazards.

17. The system as recited in claim 16, wherein the one or more operations further include:
receiving and transforming the fault probabilities and outputting new seismic data representing predicted faults within the subterranean formation, wherein the new seismic data is utilized by the well system operation.

18. The system as recited in claim 16, further comprising: another computing subsystem, including
a training seismic data receiver, capable of receiving one or more sets of seismic data from one or more sources, wherein the one or more sets of seismic data correlates to one or more subterranean locations;
another processor to perform operations including:
deriving a set of seismic attributes from each of the one or more sets of seismic data received from the training seismic data receiver,
analyzing the one or more sets of seismic data using a trained DNN and the one or more derived sets of seismic attributes, and assigning one or more fault labels.

19. The system as recited in claim 18, wherein the operations further include determining an importance coefficient and a standard deviation for the seismic attributes.

20. The system as recited in claim 18, wherein the trained DNN is a fault predictor DNN associated with the processor.

21. The system as recited in claim 20, wherein the one or more operations further include performing data normalization of seismic attributes and selecting a sub-set of seismic attributes from each of the sets of seismic attributes, where the sub-set of seismic attributes are used by the fault predictor DNN.

22. The system as recited in claim 20, wherein the operations further include computing an importance coefficient and a standard deviation to seismic attributes, where the importance coefficient and the standard deviation are utilized by the fault predictor DNN.

23. The system as recited in claim 20, wherein the fault predictor DNN is a convolutional neural network.

24. The system as recited in claim 16, wherein the operations further include replacing, utilizing a seismic attribute characteristic, two or more seismic attributes with a previously non-selected seismic attribute.

25. A computer program product having a series of operating instructions stored on a non-transitory computer-readable medium that directs a data processing apparatus when executed thereby to perform operations that include predicting subterranean formation faults, the operations comprising:
- receiving seismic data correlating to a subterranean formation;
- deriving a set of seismic attributes from the seismic data;
- determining parameterized results by analyzing the seismic data using a deep learning neural network (DNN) and the set of seismic attributes that increases the granularity of the seismic data for the analyzing, wherein the DNN has been trained using previous seismic data and previous seismic attributes;
- computing one or more fault probabilities of the subterranean formation utilizing the parameterized results and the seismic data;
- identifying subterranean hazards in the subterranean formation using the one or more fault probabilities; and
- modifying a well system operation of a borehole associated with the subterranean formation using the data processing apparatus and the subterranean hazards.

* * * * *